Patented May 8, 1934

1,958,374

UNITED STATES PATENT OFFICE 1,958,374

MANUFACTURE OF COMPOSITE AIR-BLOWN OILS

Alexander Schwarcman, Buffalo, N. Y., assignor to Spencer Kellogg and Sons, Inc., Buffalo, N. Y., a corporation of New York No Drawing. Application May 28, 1932, Serial No. 614,288

7 Claims. (Cl. 87—12)

This invention relates to the manufacture of composite air-blown oils; and it comprises processes of making composite air-blown oils wherein a mixture of a drying oil and castor oil, the former in predominant amount, is air-blown at suitable temperatures until the mixture of oils is highly oxidized, oxidation being carried to a point where the mixture will solidify on cooling, and then the hot mixture of oxidized oils thus obtained is mixed with a volatile solvent, before solidification can occur, thereby producing a solution of the composite air-blown oil, such solution being an excellent rapidly drying coating composition either with or without added ingredients; and it further comprises such solutions and such coating compositions; all as more fully hereinafter set forth and as claimed.

Many ways are known of treating drying oils, such as linseed oil, preparatory to paint and varnish making; the treatment varying according to the purposes for which the oil is used. Among these ways is the old and well known process of oxidizing linseed oil by air blowing. Air blowing may be done at any temperature between 300 and 170° F. oil temperature. The oxidized oil has many well known advantages when used in paint and varnish, but it has also some recognized disadvantages. When linseed oil is oxidized by air blowing, the specific gravity increases, but as the specific gravity increases, the solubility in various solvents decreases until, in the higher stages of oxidation, the oil is practically insoluble in some of the common solvents ordinarily used in making and thinning paints and varnishes. When the oxidation is sufficient to give an oil product having the specific gravity of about 1.0 and solid at room temperatures, the oxidized product is insoluble in benzol and like solvents. With these highly oxidized oils there is, for instance, a certain lack of miscibility with mineral oils; this being more pronounced the further the oxidation is carried. This is inconvenient. Turpentine substitutes prepared from petroleum oils are often used as thinners in the art.

In my own practice, I have found that in the usual processes of air-blowing drying oils, it is desirable to stop the oxidation when a specific gravity of 0.996 is obtained. Otherwise the blown oil does not have sufficient miscibility with mineral oils, such as turpentine substitutes. In the air-blowing of drying oils, in ordinary practice, oxidation is sometimes limited to the production of a blown oil having a specific gravity slightly above 0.990 but not exceeding 0.996, thereby ensuring sufficient solubility in the various solvents used in paints and varnishes. When the upper limit is exceeded, difficulty is encountered in making varnishes and paints, and these latter, when they can be made, are not sufficiently stable; they do not meet commerical requirements.

The spreading and flowing value of oxidized oil prepared in the usual manner, is excellent. Small amounts are sometimes mixed with other linseed oil preparations to increase luster and flowing quality. These blown oils are, however, to a certain extent treacherous; it is not possible to predict accurately the properties of a blown oil. When of good quality, the oils dry well and they are not necessarily dark in color. With even the best of these oils, however, there is a tendency to skinning or hardening and to the production of flat results. The products are also somewhat subject to yellowing in the dark.

Castor oil is, itself, often blown at high temperatures to give it greater body and to produce various different results. Air-blown castor oil, however, is no more a drying oil than the unblown. It is unsuitable by itself for use as a varnish base or the like.

In the prior and copending applications, Serial Nos. 599,367, 599,368 and 614,052, I have described processes for producing blown oils and blown oil compositions, superior to the blown oils of the older art and free from the disadvantages inherent therein. In the processes of the present invention I depart from those of these prior applications, producing different products. These products may have a high specific gravity of approximately 1.0 while retaining a good miscibility. The blown oil my be effectively used in coating compositions and the above mentioned disadvantages obviated.

In my prior and copending application Serial No. 614,052, I have disclosed processes, wherein a mixture of linseed oil and castor oil is air-blown to produce a composite air-blown oil. As described in that application, air-blowing is discontinued at a stage when upon cooling, the composite oil remains in liquid or viscous state. As stated in that application the liquid composite oil is directly miscible with pyroxylin solutions. In the present process, oxidation is carried further. The oxidation here is sufficient to produce oil products which are normally insoluble in the ordinary solvents if cooled to room temperatures. Here I obtain the desired miscibility by the addition of solvents after the oxidation has reached the desired point but before solidification into a normal insoluble condition is obtained in cooling. The present application is a continuation in part of my copending application Serial No. 614,052 and includes subsequent improvements developed in my further investigation of the problem involved.

I have now found that a composite air-blown oil desirable for paint and varnish purposes and of much improved properties, can be obtained by air-blowing a mixture of a drying oil, such as linseed oil, and castor oil, which is not itself a drying oil, in substantial amounts, until the composite air-blown oil is capable of solidifying upon cooling and then mixing the composite oil with a solvent before solidification occurs. If the air-blown mixture is cooled to room temperatures without the said addition of solvent a solid oil product having a specific gravity of approximately 1.0 would be obtained. This is hard to redissolve in the ordinary varnish solvents. The oil preparations made by my present procedures, are freely miscible with the usual solvents.

In the process of the present invention, a mixture of a drying oil and castor oil is air-blown at suitable temperatures until a test sample, upon cooling to room temperature, becomes solid or semi-solid. Then the hot composite still liquid air-blown oil is partially cooled to a temperature sufficiently low to permit the addition of volatile solvents, and a suitable amount of such a solvent is mixed with the partially cooled composite oil, thereby directly producing a solution of the composite air-blown oil. The new oil composition does not separate or solidify on cooling. Cooling of the hot composite oil is to a temperature below the boiling point of the solvent, but above that at which the composite air-blown oil alone would solidify. Solutions may be easily prepared in this manner having a high content of solids and of a desirable degree of viscosity. In coating compositions, such as varnishes and the like, it is advantageous to have solutions of high solid content. The viscosity of the solution may be varied by controlling the amount of solvent added and the other factors.

In a specific embodiment of the present invention, a mixture of linseed oil and castor oil in the ratio of 70:30 was air-blown at temperatures remaining between 120 and 300° F. until a test sample, upon cooling to room temperature, solidified. The solidified composite air-blown oil had a specific gravity of approximately 1.0 and a low iodine value. As stated in my copending application Ser. No. 614,287, an iodine value of about 90 is representative of such low iodine values. The hot composite air-blown oil was then cooled to a temperature of about 130–160° F. and benzol was admixed therewith. Other solvents such as gasoline could have been used in lieu of benzol. With benzol, any amount between 15 to 25 parts for 100 parts of the composite air-blown oil will give satisfactory results. The amount added depends on the purpose for which the solution is to be used. In this case 15 parts were used and a thick liquid obtained advantageous for general use. Gasoline, naphthas, etc., can be used in the amounts indicated for benzol.

The thick solution thus produced did not solidify upon further cooling. When exposed in the form of films or coatings, however, it dried and set rapidly, giving an excellent and protective film.

In processes under the present invention, oxidation is carried practically to the maximum extent; that is, to a degree where the iodine value of the composite air-blown oil is reduced to the minimum. This great reduction in the unsaturation of the oil appears to be mainly due to oxidation, although a part of it may be due to polymerization. The solid matter of solutions under the present invention is oxidized oils which are practically "dry". Formation of a film with it is primarily by the evaporation of solvent. Very little or none of the setting is by further oxidation of the oxidized oils in the film.

In the present process, the relative proportions of castor oil and of drying oil in the mixture, may be varied. Advantageous results may be obtained with ratios of drying oil to castor oil between 70:30 and 90:10. Ratios of 80:20 and of 70:30 are often used.

The castor oil may be any commercial grade. Refined castor oil such as Kellogg's No. 3 castor oil or C. P. castor oil are satisfactory. The C. P. castor oil is advantageous, having a lower acid value and a light color.

In most practical embodiments of the present invention I use linseed oil; customarily using as a starting material, a linseed oil which has been preliminarily treated to eliminate the "break" and color of the raw oil, but which has not been substantially polymerized or bodied. I may, however, use various other drying oils in lieu of, or as additions to linseed oil; among these other oils being perilla oils, fish oils, China-wood oil, etc.

While as stated, I customarily use linseed oil, or other drying oils, which is merely somewhat refined, and the same is true of the castor oil used, I can, under some circumstances, use with advantage especially treated oils. For example, I can use a drying oil which has been partially polymerized prior to the oxidation, in the manner described in my copending application Serial No. 599,368. Again, I can use in the present process a mixture of drying oil and castor oil which may, prior to oxidation, be quickly heated to higher temperature, at which ordinarily polymerization takes place, and then quickly cooled to lower temperatures. This does not effect any substantial polymerization. Such preliminary treatment may be effected in the manner disclosed in my copending application Serial No. 599,367. The mixture of oils, so treated, can be used as starting material in practicing the then present process. The present processes are quite flexible as to the details, and by making suitable variations, specific composite air-blown oils and solutions of the same may be prepared for particular uses.

Strangely enough, a mixture of 70 per cent linseed oil and 30 per cent castor oil air-blown at a temperature between 200 and 300° F., usually around 270° F., in the manner described ante, gives a better drying, alone and as an oil varnish, than linseed oil itself. Castor oil alone furnishes no comparable product. Solutions of the composite air-blown oils made under the present invention find many uses in the arts. A solution obtained by partially cooling an air-blown mixture of linseed oil and castor oil and mixed with benzol in the manner described is an excellent composition. Its content of solids is high and it quickly dries when applied to various surfaces, producing firm, set films in a remarkably short time. Used as a varnish it gave a dry set film in approximately an hour or less. Although the liquid composition in the form of a film quickly dries, in bulk, it is quite stable. It does not gel or solidify or skin over when properly packaged.

While all these composite air-blown oils, thinned with benzol, gasoline, etc. are excellent coating compositions, in and of themselves, they are also highly desirable materials in compounding commercial paints and varnishes, using other added materials. Various ingredients such as solvents, diluents, thinners, fillers, resins, pigments, etc., commonly used in paints and varnishes, may be easily mixed and blended with these solutions to give various types of coating compositions.

Further solutions of the composite air-blown oils in suitable solvents, are miscible with pyroxylin compositions and form a desirable component of pyroxylin lacquers. In my process, a solvent which is also a pyroxylin solvent or which is miscible with pyroxylin solvents may be used to dissolve the air-blown mixture, thereby obtaining material suitable for making pyroxylin lacquer. Pyroxylin lacquers containing materials prepared in accordance with my present process, on drying have a glossy finish which cannot be otherwise obtained.

My new coating composition give films which adhere well to metal; an important advantage. This superior adherence to metal also characterizes pyroxylin compositions containing my new coating materials.

My new coating compositions and the films obtained from them, have less tendency to yellow than ordinary oxidized linseed oil and its compositions. Further, pigment pastes may be prepared by grinding pigments in my new coating compositions. This is especially advantageous with white pigments. Pigment pastes thus prepared remain soft indefinitely and do not have a tendency to skin on the surface as do many well known pigment pastes. Also the pigment pastes are free from after yellowing effects. When a white pigment is ground in my new coating compositions and baked at temperatures of 300° F., no after yellowing effects are observed.

The present invention is capable of various modifications without departing from its generic scope. The specific illustrations and embodiments set forth ante merely illustrate certain advantageous applications of the generic invention and in no way limit that generic scope.

What I claim is:

1. As an improvement in the manufacture of composite oil preparations useful as, and in, varnishes and the like, said preparations being thick solutions in a volatile solvent, of air-blown, high-density oil mixtures normally difficultly soluble in such a solvent, the process which comprises mixing together a drying oil and castor oil in a ratio between 90:10 and 70:30, blowing a current of air through the mixture at a temperature maintained between 170° and 300° F., until upon cooling a sample to room temperatures a solidified composite oxidized oil insoluble in benzol and like solvents and having a specific gravity of approximately 1.0 is obtained, discontinuing the air blowing at this time, partially cooling the oil mixture to a temperature between 160 and 130° F., said temperature being above its solidifying point but below that of the solvent to be mixed therewith, adding between 15 and 25 per cent of an organic solvent volatile at ordinary temperatures and boiling at a temperature greater than the temperature of the partially cooled oil and cooling the oil-solvent mixture to the ordinary temperature.

2. The process of claim 1 in which the said drying oil is linseed oil and the temperatures at which the air blowing is effected are between 200° and 300° F.

3. The process of claim 1 in which the said solvent is a coal tar oil and the partial cooling is to about 130° F.

4. The process of claim 1 in which the solvent is benzol.

5. The process of claim 1 in which the solvent is an organic liquid miscible with pyroxylin solutions.

6. The process of claim 1 in which linseed oil and castor oil are mixed in the ratio 70:30 and the air blowing is effected at about 270° F.

7. As an improvement in the manufacture of composite oil preparations useful as, and in, varnishes and the like, said preparations being thick solutions in a volatile solvent, of air-blown, high-density oil mixtures normally difficultly soluble in such a solvent, the process which comprises mixing together linseed oil and castor oil in a ratio of 70:30, blowing a current of air through the mixture maintained at a temperature of about 270° F. until upon cooling a sample to room temperatures a solidified composite oxidized oil insoluble in benzol and having a specific gravity of approximately 1.0 is obtained, discontinuing the air blowing at this time, partially cooling the oil mixture to about 130° F., adding 15 per cent benzol and cooling the oil-solvent mixture to the ordinary temperature.

ALEXANDER SCHWARCMAN.